May 18, 1926.

H. A. W. WOOD

ANTIFRIARING DEVICE

Original Filed March 24, 1921    4 Sheets-Sheet 1

1,584,828

Inventor
Henry A. Wise Wood
By Attorneys

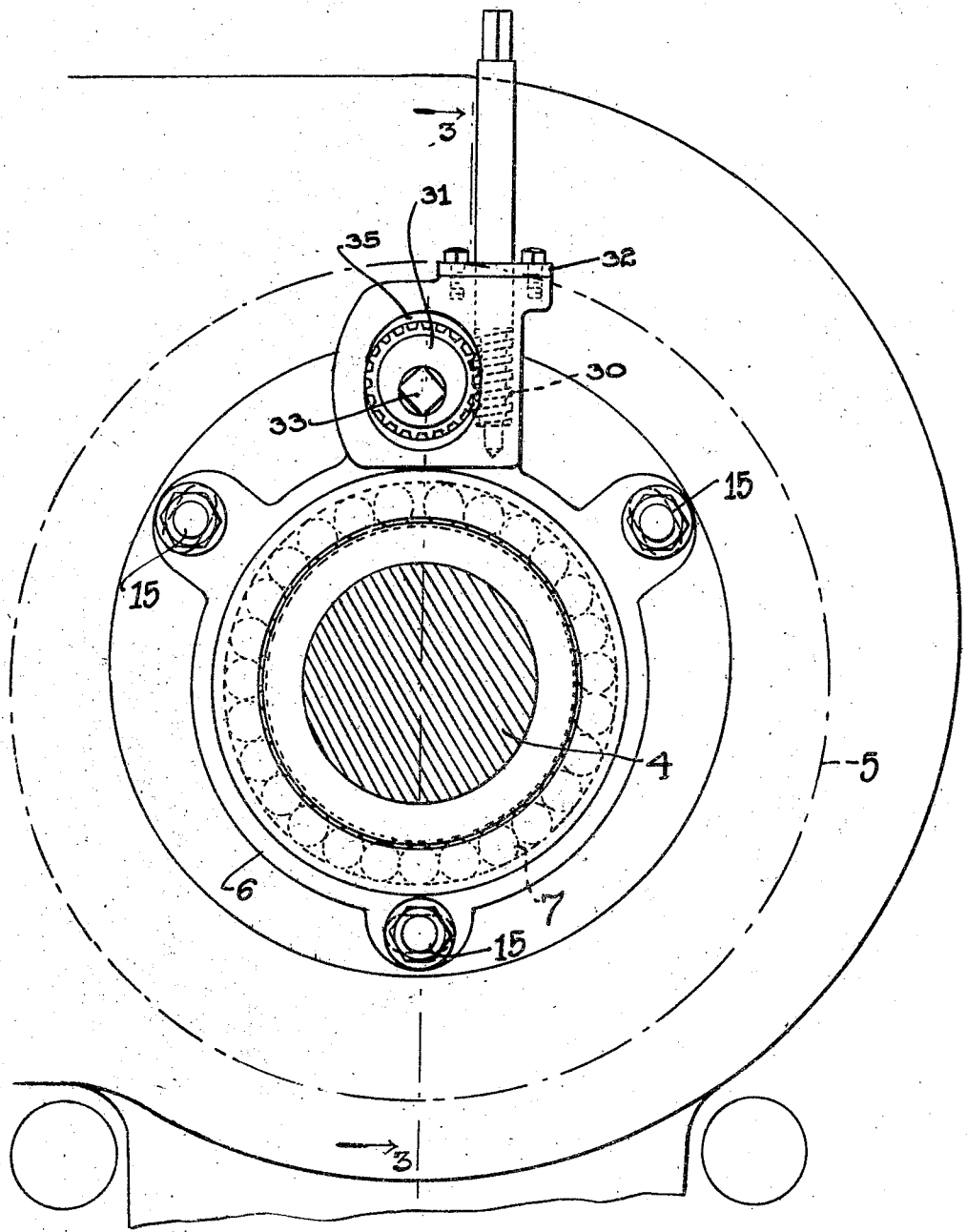

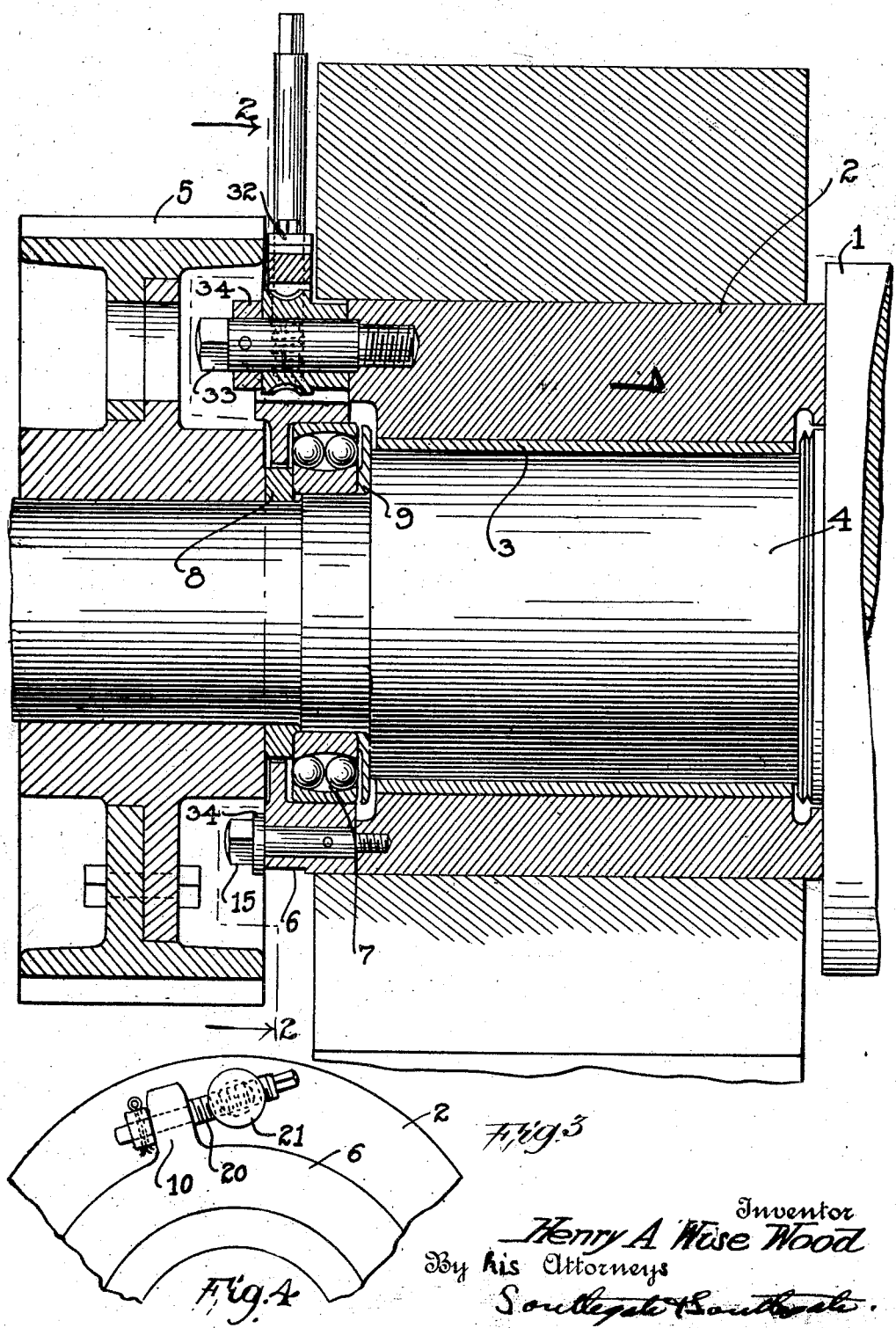

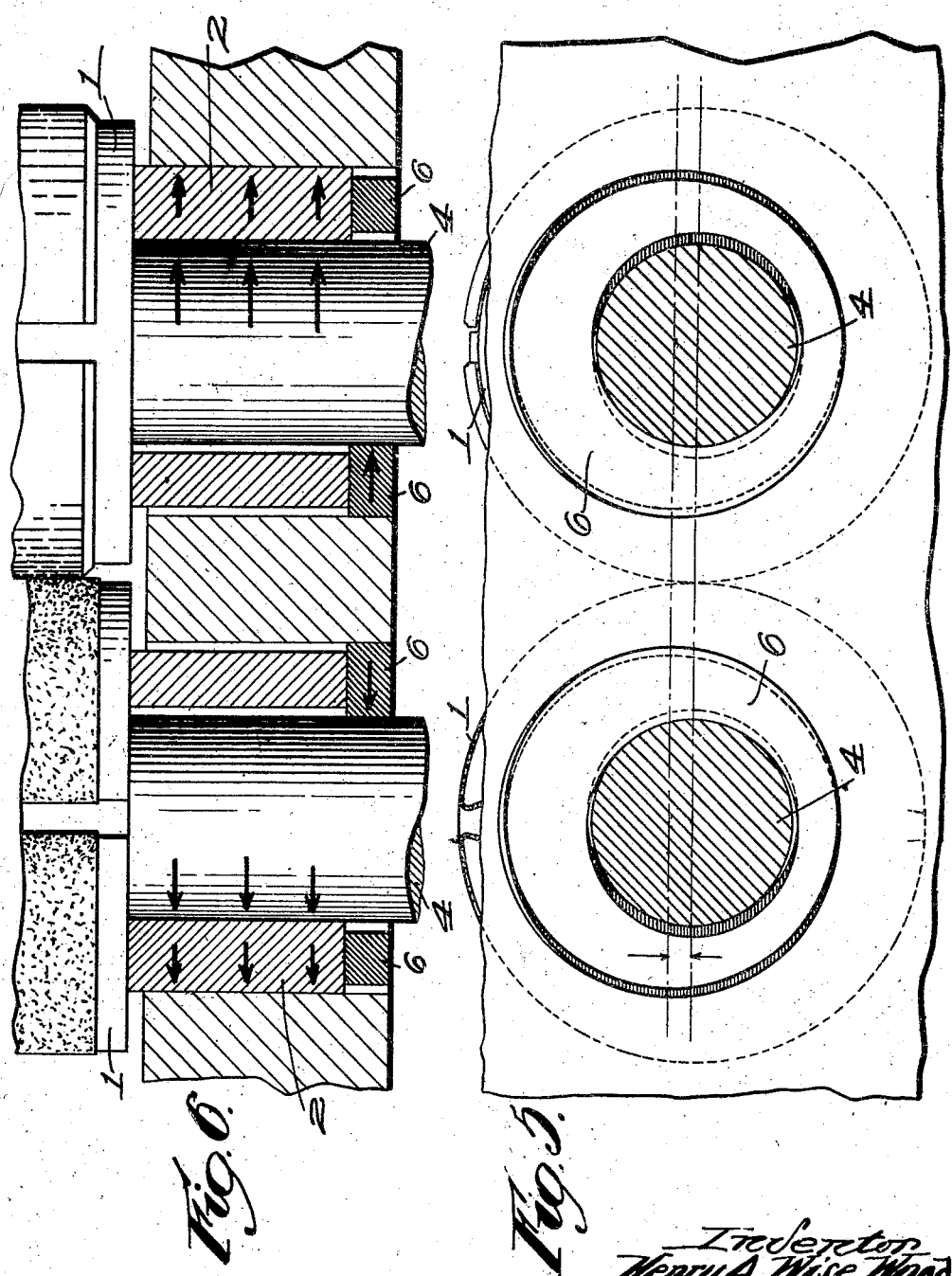

Patented May 18, 1926.

1,584,828

UNITED STATES PATENT OFFICE.

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA.

ANTIFRIARING DEVICE.

Application filed March 24, 1921, Serial No. 455,347. Renewed September 4, 1925.

The principal objects of this invention are to carry out more fully the principles of my Patent No. 1,417,652 patented May 30, 1922 on an application filed July 17, 1918 and to improve thereon, and more specifically, to avoid the necessity of cutting away the bearing box in order to insert the take-up device; to provide an arrangement which can be easily inspected; to provide one which cannot apply a breaking action to the journal of the cylinder; to provide for automatic adjustment to take up the slight wear, thus eliminating the delicate operation necessary where hand adjustment is used and preventing the postponement of adjustment after it becomes necessary; and to provide a single adjustment serving to act on both cylinders of the couple.

Further objects and advantages of the invention will appear hereinafter.

Reference is to be had to the accompanying drawings in which

Fig. 2 is an end view of a bearing for one of the cylinders showing a modification;

Fig. 3 is a sectional view of the same on the line 3—3 of Fig. 2;

Fig. 4 is a fragmentary end view showing another modification.

Fig. 5 is a diagrammatic sectional view on enlarged scale through the two journals showing the eccentricity considerably exaggerated, and omitting several parts; and Fig. 6 is a central horizontal sectional view of the same on the same scale.

Figure 1:
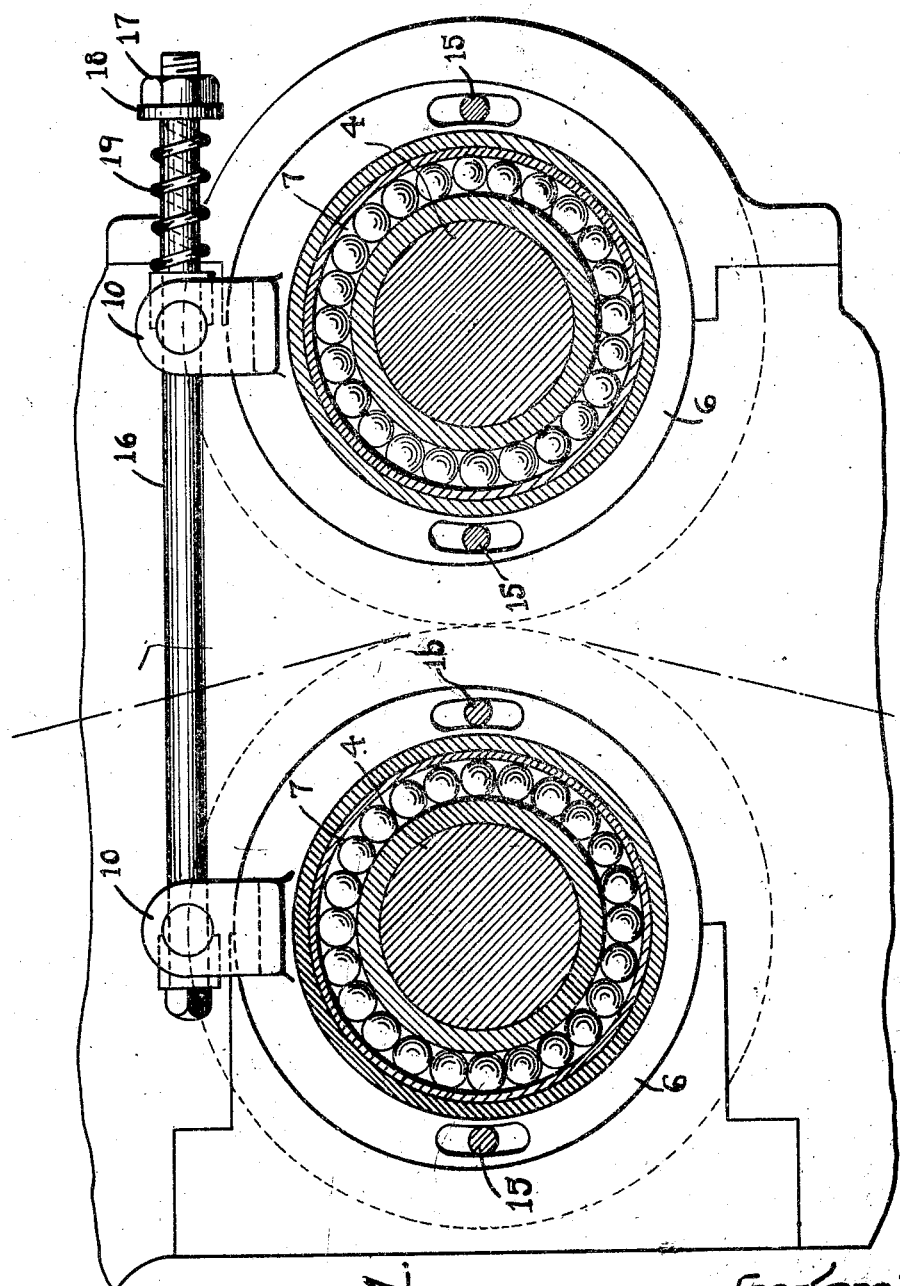
Fig. 1 is a sectional view through the journals of a printing couple illustrating one way in which the invention can be applied thereto.

As stated in my above identified application, the rotary web newspaper printing press is limited in speed on account of several things. One of the limitations is due to the fact that when the gap between the two following plates of a plate cylinder comes to the impression point the strain of printing is relaxed suddenly and the cylinders tend to spring together The printing periphery of the impression cylinder moves into the gap and, as soon as the gap passes, the edge of the oncoming printing plate delivers a blow to the impression cylinder. This sets up a vibration which results in "friaring," namely, the production of waves of heavy and light color on the print. This obviously interferes with the perfection of the work. The causes of this phenomenon are that if either cylinder or shaft is too light or the supporting frame is too weak the parts will be allowed to spring as stated above, and cause this difficulty. Also if these parts are sufficiently heavy they will not spring, but the effect will still be present if there is any play in either of the cylinder journal boxes. This play is present I find in all cases. Even the microscopic oil space left between the journal box and journal, which is usually not more than one or two thousandths of an inch, is sufficient to permit of such an oscillation and its consequent imperfect product where the present high speeds are used.

The blanket against which the news print paper is pressed by the printing plate has a hard oilcloth face that is not as resilient as would appear. If the printing plate covered with small characters is pressed too far into the paper the bottoms of the letters, as well as their faces, will print. This blurs them and is liable to fracture the paper and cause stoppage of the machine. The wear of the boxes above mentioned allows the cylinder shafts to vibrate so that the cylinders cannot be kept at any accurate distance apart for any appreciable length of time. Owing to the fact that the paper itself is only 3/1000 of an inch thick it will be obvious that only a little wear has to take place to equal the thickness of the paper. On account of these difficulties and the heavy pressure under which the cylinders work the speed of operation is ordinarily kept below 500 turns per minute. One of the objects of this invention is to avoid these difficulties so as to permit of higher speed.

In my above mentioned patent I accomplish these objects by means of wedges set in the journal boxes which could be constantly adjusted in such a way that they would keep the journal boxes thrust snugly against the working sides of the respective boxes. In that way even after great wear the operator could take up the wear from day to day and secure good printing without broken sheets. However, this would cut away a great deal of the journal box itself and thus reduce its wearing surface. Furthermore the friction of the wedge itself was exerted on the journal so as to have a braking effect and causing heat.

This invention is designed to overcome these difficulties of the prior devices and to provide a take-up device located outside the box and placed against the journal just at the point where the latter emerges from the box, so that it can be got at easily for inspection and repairs. In this way I leave the box with its normal wearing surface and I also provide an anti-friction ball bearing at this point so that no increase in the friction will be produced by it.

The bearing balls also have enough elasticity, I find, so that, if there is a heating and consequent expansion of the parts, they yield slightly, but enough to relieve the parts and permit the machine to continue to run without clamping the bearing. Heretofore the heating of the parts has caused enough expansion to make the bearing seize and stop the press.

The steel bearing balls on the market are elastic. They are compressible but they react instantaneously. They act like, and in fact are, spherical springs. Therefore this bearing can be set very firmly against one side of the journal, so that the journal bears with equal firmness against the working side of the box. This result is secured by this invention without producing the rigid clamping effect that was exerted in all previous devices.

In my above mentioned patent I have set forth a method of obviating this difficulty which is based on the causes thereof and secures the desired results in a higher degree than can be accomplished merely by producing the parts in a heavy form and fitting them more snugly. The present invention has to do with the further perfection of that method by means of apparatus designed for the purposes mentioned above.

Instead of inserting a block in the box itself as in that case, I surround the journal just outside the box with a ball bearing. The inner ring of this ball bearing is secured to the journal while the outer ring is carried in a housing which may be adjustably secured to the journal box itself or to a part of the frame of the machine. I place this against the journal at the point where it emerges from the box so as to be readily accessible. This does away with all need of cutting into the journal box and reducing the bearing area. I apply pressure to against the outer race so as to thrust and hold the journal firmly against the workside of its box as in my above identified patent. I, of course, provide for performing this operation on both cylinders and as will appear hereinafter I have shown a means for accomplishing this adjustment automatically for both cylinders.

It is to be noted that the form shown in Figs. 2 and 3 is somewhat modified from that shown in Fig. 1, but in describing the elements of the press itself I sometimes refer to Fig. 3 where they are shown more fully. The invention is shown as applied to two cylinders constituting a printing couple, each journal 4 of each cylinder 1 being mounted in a cylindrical box 2 made eccentric outside primarily for the adjustment of the cylinders toward and from each other. This box is fixed in an eccentric hole in the frame and has a lining 3 in which the journal 4 of the cylinder is located. On this journal is a gear 5 for transmitting power to it.

Surrounding a reduced part of the journal between the end of the lining 3 and the gear 5 in the hole in the frame which receives the box 2 is a take-up housing 6. This housing has an eccentric circular periphery having the same eccentricity as the box 2 and therefore adapted to be turned in the same hole. On the reduced part of the journal within the housing 6 is a take-up bearing 7 with a filling-in collar 8 at its end. An oil collar 9 of well known construction is also shown. This bearing 7 is shown as of an anti-friction type thus eliminating the friction of the take-up device. The housing itself is provided with ears projecting from it and having circumferential slots through which pass guide studs 15 mounted in stationary position on the frame or box and provided with heads. The housing, therefore, can be turned slightly for adjustment of the journal, but the exterior cylindrical surface is always concentric with the box 2.

In the form shown in Fig. 1, the ball-bearing is of course concentric with the journal, but it is held in the eccentric recess in the housing 6. This housing has a projection 10 extending radially therefrom by which it can be turned on an axis for adjusting purposes. When pressure is applied to the projection 10 inwardly, the housing 6 will turn slightly and force the journal over a little and have the same effect as in my above identified application. That is, by the adjustment pressure is applied to the journal through the outer race in a direction to hold the journal 4 firmly against the work side of its bearing. In the form shown in Fig. 1 this is the lower outer side.

For the purpose of avoiding the necessity of adjusting each of these housings separately and by hand I locate the two projections 10 on the two housings preferably at the top and across them I locate a rod 16 having a head on one end and a nut 17 on the other. Under this nut there is a collar 18 and a spring 19 is located between the collar and the adjacent projection 10.

This spring can be made as strong as necessary and its function is to always pull the projections 10 toward each other and tend to turn the two housings 6 toward each other at the top. This forces both journals toward the working sides of their boxes and has the effect described in connection with my above identified case. Thus the spring serves automatically to keep the two cylinders of the couple so adjusted that the journals they control shall always remain firmly against the work-sides of their bearings under a predetermined pressure controlled by the spring. This action occurs and is retained regardless of the amount of wear which occurs. If at any time it is desired to avoid a yielding pressure and employ a positive connection a screw, as for example, that shown at 20 in Fig. 4, can be employed in cooperation with a stud 21 on the frame. This screw screws through the stud and adjusts each of the cylinders separately or a positive screw arrangement can be employed in the form shown in Fig. 1 as will be obvious to any one skilled in the art. Figs. 5 and 6 show this action exaggerated, the parts 3, 7, 8, 9 and 15 being omitted to avoid confusion.

In the form shown in Figs. 2 and 3 I have illustrated an adjusting worm 30 for adjusting a worm gear 31 located in an enlargement on the housing 6. A cap 32 is provided for making a bearing for the adjusting worm. The gear 31 has a stud 33 screwing into the end of the cylinder bearing on which it is eccentrically located. The gear is located in an opening 35 in the eccentric housing 6. A collar 34 is shown and the same guide studs 15 as shown in Fig. 1.

When the worm 30 turns or the pressure of the spring 19 is allowed to operate in Fig. 1 the housing 6 is turned slightly. Its circumferential motion is short, but it applies pressure in either case in the manner indicated in Fig. 1. This causes the housing to be turned in the frame. In this case the amount of eccentricity, that is, the distance between the centers of the housing 6 and the journal 4 acts as a lever to hold the journal firmly against the side of the box. This prevents the journal from rebounding or jumping when pressure between the printing cylinders is released as stated above.

By thus holding the two members of the printing couple at the same distance apart at the time they pass the margins and during the true printing operation, I prevent the springing of the cylinders toward and from each other when the strain is passing from the minimum to the maximum and vice versa. This prevents the vibration and is an important factor in permitting of speeds much higher than those now in use. The steel balls of the ball bearing are elastic. They constitute spherical springs that are compressible but react quickly. Therefore if there is any heating and expansion of the parts, the bearing, although set very firmly against one side of the journal, will yield sufficiently to relieve the rigid clamping action that would be produced if it were not for the ball bearings. This is a very important feature of the invention because with all previous constructions the press was liable to be stopped on account of the heating, expanding, and consequent clamping of the bearing.

I also avoid the cutting away of the journal box in order to insert it, locate the bearing outside where it can be inspected very readily, prevent it from applying any braking effect at any time, and, in the form shown in Fig. 1, do away with the necessity for hand adjustment. This an extremely delicate operation which few men are competent to perform. The result is that it is not ordinarily readjusted until the "friaring" effect has become very bad, but with the present invention, particularly in its preferred form as shown in Fig. 1, the adjustment is automatic and immediate.

Although I have illustrated and described only three forms of the invention I am aware of the fact that modifications can be made therein by any person skilled in the art without departing from the scope of the invention as expressed in the claims.

Therefore I do not wish to be limited to all the details of construction herein shown and described, but what I do claim is:—

1. In a printing press, the combination with a printing couple, of boxes for the journals thereof, a bearing at the end of each journal in its box, a housing for each bearing, means extending from one housing to the other on each side of the press for connecting said housings, and means constantly acting on said means to force the housings circumferentially in opposite directions.

2. In a rotary printing press, the combination with a printing couple consisting of impression and plate cylinders having journals, and boxes for said journals, of external housings for the journals, housings for said bearings, and means cooperating with said housings for yieldingly forcing both of said cylinders apart and each of their journals against the working sides of their boxes which receive the wear and constantly holding them in that position to prevent their movement toward each other irrespective of wear.

3. In a printing press, the combination with a printing couple, of two pairs of boxes for the journals of the cylinders, a ball bearing cage externally mounted on the end of each journal, a housing for each cage, a rod extending from one housing to the other on each side of the press, and a spring on the rod arranged to force the housings circumferentially in opposite directions.

4. In a printing press, the combination of a pair of co-operating printing cylinders at the end of each of which is a journal and its box, and a take-up device adapted to keep the journal of each against the working side of its box, the said take-up device of one cylinder journal being connected to a take-up device of the opposite cylinder journal, so that the journals of both will be thrust apart and held against the working sides of their respective boxes with a pressure common to both.

5. The combination, in a rotary printing press, of a supporting frame, a cylinder of the printing couple, and its boxes having bearings for the journals thereof, with means located externally of said frame on a box, entirely beyond the bearing surface of the journal, for adjusting said bearing circumferentially and eccentrically to cause the journal to press against the working surface of the box to prevent lateral motion of said cylinder.

6. In a rotary printing press, the combination of one of the cylinders of a printing couple having external ball bearings for the ends of its journals adjustably located on the box beyond the journal bearings and accessible from the outside, with an eccentric take-up housing outside the frame adjustable circumferentially to keep the journal firmly against the working surface of its box, irrespective of the pressure to which any point on the circumference of the cylinder is subjected.

7. In a printing press, the combination with a cylinder and its boxes, of an antifrictional cage on each journal at the side of the box and entirely surrounding the journal, and means for exerting pressure on said cage to force the journals against the work sides of their boxes.

8. In a rotary printing press, the combination with a frame, a printing couple consisting of impression and plate cylinders having journals, and boxes for said journals, of additional bearings located outside of said frame where the journals emerge from the boxes, and means co-operating with said additional bearings for forcing said cylinders apart to take up the wear.

9. In a rotary printing press, the combination of a supporting frame, a cylinder of the printing couple, and its boxes having bearings for the journals thereof, with means located externally of said bearings for maintaining the said journals against the working sides of their bearings.

10. The combination, in a rotary printing press of the frame, a printing couple and a box having a bearing for a journal of one of the cylinders of the printing couple, with adjustable means located beyond the line of said bearing for holding said journal against the working side of its bearing.

11. In a printing press, the combination of a pair of co-operating printing cylinders, a journal and its box at the end of one of them with circumferentially adjustable means located adjacent to said bearing but outside the bearing surface for holding the journal against the working side of its bearing.

12. The combination with a rotary printing press, of a supporting frame, a cylinder forming one of the printing couple, and its boxes having bearings for the journals thereof, with means eccentric to said bearing located outside the bearing surfaces for maintaining the said journals against the working sides of their bearings.

13. In a printing cylinder bearing, the combination with a box and a journal, of elastic means for holding the journal against the working side of the box.

14. In a printing cylinder bearing, the combination with a box and a journal, of elastic means for holding the journal against the working side of the box, and means for adjusting said elastic means.

15. In a printing cylinder bearing, the combination with a box and a journal, of elastic means for holding the journal against the working side of the box, said elastic means comprising a series of compressible rolling elements.

16. In a printing cylinder bearing, the combination with a box and a journal, of elastic means for holding the journal against the working side of the box, said elastic means comprising a series of independently rotatable steel balls constituting an antifriction bearing.

17. In a printing cylinder bearing, the combination of a box, a printing cylinder journal, a cage on the journal, and compressible elastic members in the cage capable of yielding quickly to relieve the pressure if the parts heat and expand, whereby the bearing will not seize and stop rotation of the cylinder.

18. In a printing press, the combination with a cylinder and its boxes, of an antifrictional cage on each journal of the box and surrounding the journal, said cage comprising a set of elastic elements, and means for exerting pressure on said cage to force the journals against the work sides of their boxes.

In testimony whereof I have hereunto affixed my signature.

HENRY A. WISE WOOD.